United States Patent
Xiang et al.

(10) Patent No.: US 9,313,225 B2
(45) Date of Patent: Apr. 12, 2016

(54) METHOD FOR PACKET PROCESSING, ELECTRONIC DEVICE AND STORAGE MEDIUM

(71) Applicant: HUIZHOU TCL MOBILE COMMUNICATION CO., LTD., Huizhou, Guangdong (CN)

(72) Inventors: Jinming Xiang, Huizhou (CN); Dan Zhou, Huizhou (CN); Xiaofeng Lu, Huizhou (CN); Jun Wu, Huizhou (CN)

(73) Assignee: HUIZHOU TCL MOBILE COMMUNICATION CO., LTD., Huizhou, Guangdong (CN)

( * ) Notice: Subject to any disclaimer, the term of this patent is extended or adjusted under 35 U.S.C. 154(b) by 0 days.

(21) Appl. No.: 14/388,989

(22) PCT Filed: Aug. 7, 2013

(86) PCT No.: PCT/CN2013/080991
§ 371 (c)(1),
(2) Date: Sep. 29, 2014

(87) PCT Pub. No.: WO2014/067310
PCT Pub. Date: May 8, 2014

(65) Prior Publication Data
US 2015/0067840 A1    Mar. 5, 2015

(30) Foreign Application Priority Data
Nov. 1, 2012 (CN) .......................... 2012 1 0430244

(51) Int. Cl.
*G06F 11/00* (2006.01)
*H04L 29/06* (2006.01)
(Continued)

(52) U.S. Cl.
CPC .......... *H04L 63/1458* (2013.01); *H04L 5/0055* (2013.01); *H04L 29/06095* (2013.01); *H04L 69/16* (2013.01)

(58) Field of Classification Search
CPC ... H04L 5/0055; H04L 63/1458; H04L 69/16; H04L 69/163; H04L 29/06095; H04L 29/06115
USPC .......................................................... 726/22
See application file for complete search history.

(56) References Cited

U.S. PATENT DOCUMENTS 6,701,370 B1 *   3/2004   Dillon .......................... 709/230
6,772,334 B1 *   8/2004   Glawitsch ..................... 713/153
(Continued)

FOREIGN PATENT DOCUMENTS

CN    101594359 A    12/2009
CN    101729513 A     6/2010
(Continued)

OTHER PUBLICATIONS

International Search Report dated Oct. 24, 2013; PCT/CN2013/080991.

*Primary Examiner* — Ashok Patel
*Assistant Examiner* — Gary Gracia
(74) *Attorney, Agent, or Firm* — Ladas & Parry LLP (57) ABSTRACT

A method for processing packets, an electronic device and a storage medium are proposed. The present invention presets a defense module preventing DoS in the mobile terminal. A connection requesting side establishes connection with the defense module according to three-handshake principle of TCP, and a defense module sends a SYN packet to a mobile terminal as the connection requesting side. When the defense module successfully handshakes with the mobile terminal, connection between the connection requesting side and the mobile terminal is created, so that DoS attack, especially SYN attack can be effectively prevented. When mobile terminals, especially mobile phones are network hotspot, attack on internal mobile terminal from external network can be effectively prevented.

15 Claims, 3 Drawing Sheets

(51) Int. Cl.
*H04L 5/00* (2006.01)
*G06F 12/14* (2006.01)

(56) References Cited

U.S. PATENT DOCUMENTS

| | | | |
|---|---|---|---|
| 6,823,387 | B1 | 11/2004 | Srinivas |
| 8,059,546 | B2* | 11/2011 | Pai et al. ............... 370/236 |
| 8,800,001 | B2 | 8/2014 | Jiang |
| 2004/0008681 | A1 | 1/2004 | Govindarajan et al. |
| 2004/0111635 | A1* | 6/2004 | Boivie et al. ............ 713/201 |
| 2004/0123142 | A1 | 6/2004 | Dubal et al. |
| 2005/0021999 | A1* | 1/2005 | Touitou et al. .......... 713/200 |
| 2005/0094637 | A1* | 5/2005 | Umesawa et al. ....... 370/389 |
| 2005/0138180 | A1* | 6/2005 | Minami et al. .......... 709/227 |
| 2005/0238034 | A1* | 10/2005 | Gillespie .......... H04L 29/12509 370/401 |
| 2006/0098585 | A1* | 5/2006 | Singh et al. ............. 370/252 |
| 2006/0104288 | A1* | 5/2006 | Yim et al. ............ 370/395.52 |
| 2007/0094730 | A1* | 4/2007 | Bhikkaji et al. ............ 726/24 |
| 2007/0201474 | A1* | 8/2007 | Isobe .................. H04L 63/1458 370/392 |
| 2007/0233877 | A1* | 10/2007 | Qu et al. ................. 709/227 |
| 2007/0291782 | A1* | 12/2007 | Basso et al. ............. 370/428 |
| 2010/0232294 | A1* | 9/2010 | Samuels et al. .......... 370/235 |
| 2010/0235902 | A1* | 9/2010 | Guo et al. ................. 726/12 |
| 2011/0131646 | A1* | 6/2011 | Park et al. ................ 726/13 |
| 2011/0202972 | A1* | 8/2011 | Jiang ..................... H04L 63/08 726/3 |
| 2011/0320589 | A1* | 12/2011 | Hietala ................... 709/224 |
| 2012/0131205 | A1* | 5/2012 | Pyatkovskiy ............. 709/227 |
| 2012/0227088 | A1* | 9/2012 | Gao ........................... 726/3 |
| 2013/0083799 | A1* | 4/2013 | Xie .................... H04L 47/193 370/394 |

FOREIGN PATENT DOCUMENTS

| CN | 102655509 A | 9/2012 |
|---|---|---|
| CN | 102946387 A | 2/2013 |

* cited by examiner

METHOD FOR PACKET PROCESSING, ELECTRONIC DEVICE AND STORAGE MEDIUM

BACKGROUND OF THE INVENTION

1. Field of the Invention

The present invention relates to a field of network communication, more particularly, to a method for packet processing, an electronic device and a storage medium.

2. Description of the Prior Art

Denial of Service (DoS) is a conventional network attack which is relatively effective and very untenable. The primary object of DoS is disenabling a server to provide service for regular users. As a result, DoS profoundly threatens enterprises and organizations heavily relying on internet.

As mobile network flourishes, smart phones become primary internet devices. As 4G and IPV6 prosper, smart phones will play a more important role in mobile internet. However, mobiles phones are increasingly used as soft access point (soft AP) by computers; meanwhile the number of apps for computers using mobile phones to surf on internet is rising. As smart phones are completely exposed on internet, they are very venerable to attacks from the external network, especially DoS which put mobile phones in huge network risk and low security.

SUMMARY OF THE INVENTION

Given the defects mentioned above of conventional art, the present invention is to provide a method for packet processing, an electronic device and a storage medium, to solve the problem that conventional electronic devices, especially mobile phones are vulnerable to DoS.

According to an embodiment of the present invention, a method for packet processing comprises:

when receiving a first handshake (SYN) packet of connection request from a connection requesting side, establishing a first handshake-acknowledge (SYN-ACK) packet using a defense module of an electronic device, and responding the connection requesting side by sending the first handshake-acknowledge packet to the connection requesting side;

when receiving a first acknowledging (ACK) packet from the connection requesting side, creating a second handshake packet with the same SEQ number and the same ACK number with the first handshake packet, and sending the second handshake packet to a packet processing module of the electronic device through a transmission control protocol/internet protocol (TCP/IP) protocol stack, wherein the second handshake packet comprises a SEQ number Y of the first handshake-acknowledge packet;

receiving a second handshake-acknowledge packet from the packet processing module through the TCP/IP protocol stack, and modifying a SEQ number Z of the second handshake-acknowledge packet to the SEQ number Y of the first handshake-acknowledge packet, and sending the modified second handshake-acknowledge packet to the defense module, at the same time storing a difference value R of SEQ numbers, wherein $R=Z-Y$;

when receiving the modified second handshake-acknowledge packet, establishing a second acknowledge packet with an ACK number Y+1 by using the defense module, and sending the second acknowledge packet to the TCP/IP protocol stack; and according to the difference value R of SEQ numbers, modifying the ACK number of the second acknowledge packet to Z+1 through the TCP/IP protocol stack, and sending the modified second acknowledge packet to the packet processing module, so that handshake between the defense module and the packet processing module succeeds, and connection between the connection requesting side and the packet processing module is created.

According to another embodiment of the present invention, an electronic device comprises: one or more processors; a memory; one or more programs stored in the memory, being executed by the one or more processors to perform a method of processing packets, the one or more programs comprises a defense module, a TCP/IP protocol stack, and a packet processing module;

when receiving a first handshake (SYN) packet of connection request from a connection requesting side, the defense module establishes a first handshake-acknowledge (SYN-ACK) packet, and responds the connection requesting side by sending the first handshake-acknowledge packet to the connection requesting side;

when receiving a first acknowledging (ACK) packet from the connection requesting side, the defense module creates a second handshake packet with the same SEQ number and the same ACK number with the first handshake packet, and sends the second handshake packet to the packet processing module through a transmission control protocol/internet protocol (TCP/IP) protocol stack, where the second handshake packet comprises a SEQ number Y of the first handshake-acknowledge packet;

the TCP/IP protocol stack receives a second handshake-acknowledge packet from the packet processing module through, and modifies a SEQ number Z of the second handshake-acknowledge packet to the SEQ number Y of the first handshake-acknowledge packet, and sends the modified second handshake-acknowledge packet to the defense module, at the same time storing a difference value R of SEQ numbers, where $R=Z-Y$;

when receiving the modified second handshake-acknowledge packet, the defense module establishes a second acknowledge packet with an ACK number Y+1, and sends the second acknowledge packet to the TCP/IP protocol stack; and the TCP/IP protocol stack modifies the ACK number of the second acknowledge packet to Z+1 according to the difference value R of SEQ numbers, and sends the modified second acknowledge packet to the packet processing module, so that handshake between the defense module and the packet processing module succeeds, and connection between the connection requesting side and the packet processing module is created.

According to various embodiment of the present invention, a storage medium storing instructions executed by a processor for performing a method of packet processing is provided. The method comprising:

when receiving a first handshake (SYN) packet of connection request from a connection requesting side, establishing a first handshake-acknowledge (SYN-ACK) packet using a defense module of an electronic device, and responding the connection requesting side by sending the first handshake-acknowledge packet to the connection requesting side;

when receiving a first acknowledging (ACK) packet from the connection requesting side, creating a second handshake packet with the same SEQ number and the same ACK number with the first handshake packet, and sending the second handshake packet to a packet processing module of the electronic device through a transmission control protocol/internet protocol (TCP/IP) protocol stack, wherein the second handshake packet comprises a SEQ number Y of the first handshake-acknowledge packet;

receiving a second handshake-acknowledge packet from the packet processing module through the TCP/IP protocol stack, and modifying a SEQ number Z of the second handshake-acknowledge packet to the SEQ number Y of the first handshake-acknowledge packet, and sending the modified second handshake-acknowledge packet to the defense module, at the same time storing a difference value R of SEQ numbers, wherein R=Z−Y;

when receiving the modified second handshake-acknowledge packet, establishing a second acknowledge packet with an ACK number Y+1 by using the defense module, and sending the second acknowledge packet to the TCP/IP protocol stack; and according to the difference value R of SEQ numbers, modifying the ACK number of the second acknowledge packet to Z+1 through the TCP/IP protocol stack, and sending the modified second acknowledge packet to the packet processing module, so that handshake between the defense module and the packet processing module succeeds, and connection between the connection requesting side and the packet processing module is created.

The method for packet processing, the electronic device and the storage medium effectively solve the problem that conventional electronic devices, especially mobile phones are vulnerable to DoS, and effectively prevent DoS attack, especially handshake signal (SYN) attack, meanwhile effectively defense the attack on electronic devices internal from the external network when electronic device, especially mobile phones are used as soft ap.

DETAILED DESCRIPTION OF THE PREFERRED EMBODIMENTS

In order to illustrate the technique and effects of the present invention, a detailed description will be disclosed by the following disclosure in conjunction with figures. It is noted that the same components are labeled by the same number.

In the following illustrations, the detailed embodiment of the present invention refers to steps and signals in one or a plurality of computers practice process, unless other illustrations exist. Therefore, people will understand these steps and practices, a number of which are operated by computers, including by computer processing units presenting electronic signals of a structured type data. The operation transforms the data or sustains the data at its position in the memory system of the computer, which can be re-configured, or operation of the computer is changed through other ways a skilled person in the art is familiar with. The data structure the data sustains is an physical position of the memory system, which bears particular properties the data structure defines. However, the illustration above of the principle of the present invention is not limited; a skilled person in the art will perceive that a plurality of steps and practices below can also be embodied in hardware.

The terminologies of the application, such as component, module, system and interface, all refer to concerning computer entities: hardware, combination of hardware and software, software or software in practice. For instance, assemblies can be but not limited to proceedings processed on processors, processors, objects, executable applications, executing threads and/or computers. As figures indicate, applications processing on a controller or the controller itself can both be an component. One or a plurality of components can exist in executing proceedings and/or threads, meanwhile locate in one computer and/or dissipate between two or more computers.

Moreover, subjects wanting protection can be realized as method, devices or manufacturers producing software, firmware, hardware or any random combination to control computers using standard programming and/or engineering skills. The term "manufacturer" used here refers to any computer program which can be visited from any computer readable equipment, carrier or medium. Naturally, a person skilled in the art will see that this configuration can be modified in multiple ways while still stay in the range or principle of the subject wanting protection.

Figure 1:
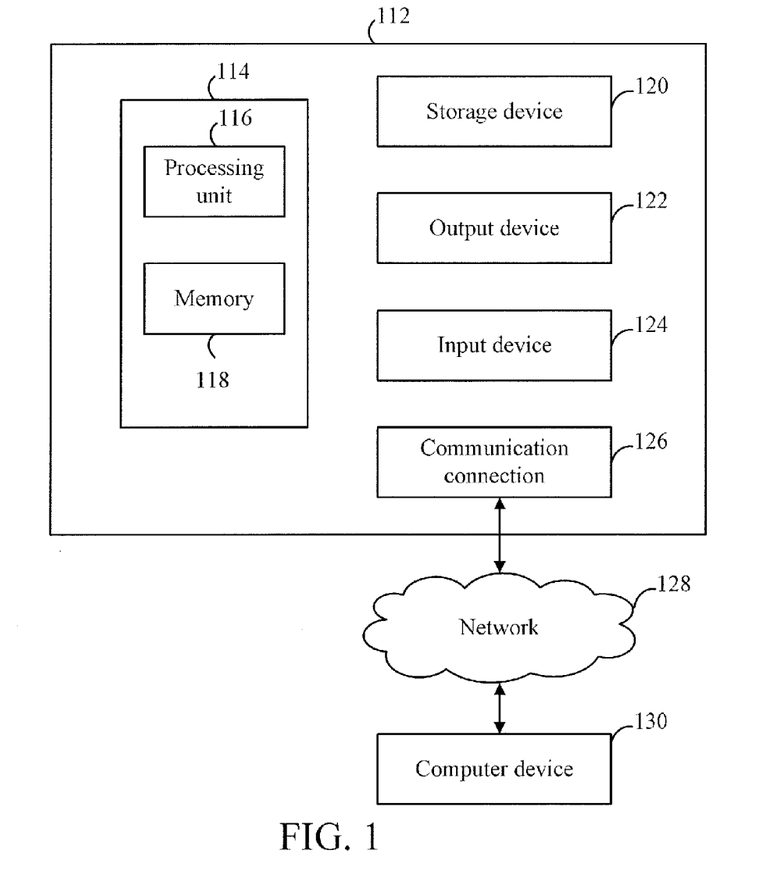
FIG. 1 shows an electronic device in an operation environment.

FIG. 1 and the following discussion provide brief summary of the operation environment of the electronic devices of the present invention. The operation environment of FIG. 1 is just an embodiment of proper operation environment with no aim to suggest any limit of the range of purposes or function of the operation environment. An electronic device 112 in the embodiment comprises but is not limited to personal computers, server computers, handset or laptop devices, mobile devices (such as mobile phones, personal digital assistants (PDA), media players, etc.), multiple processor systems, consumer electronics, minicomputers, mega computers, distributing computing environment comprising any system or device above mentioned, etc.

The embodiment is described under general background that "computer readable instructions" are processed by one or multiple electronic devices, although it is not requested. A computer readable instruction can be distributed by computer readable medium (as discussed below). The computer readable instruction can be realized as program modules, such as processing particular missions or realizing function, subject, application program interface (API) and data structure of particular abstract data types. Typically, the function of the computer readable instruction can be randomly combined or distributed in any environment.

FIG. 1 indicates an example of the electronic device 112 of one or a plurality of embodiments of a method for packet process of the present invention. The electronic device 112 comprises at least a processor 116 and a memory 118. According to specific configuration and type of the electronic device, the memory 118 can be volatile (such as RAM) or non-volatile (such as ROM or flash memory), or some combination of the above two types. The configuration is indicated via broken lines in FIG. 1.

In other embodiments, the electronic device 112 can also comprises additive storage devices (such as removable and/or non-removable), including but not limited to magnetic storage devices, light storage devices, etc. These additive storage devices are indicated by a storage device 120 in FIG. 1. In one embodiment, the computer readable instruction to realize one or a plurality of embodiments of the present invention can be stored in the storage device 120. The storage device 120 can also store other computer readable instructions to realize operating systems or application programs, etc. The computer readable instructions can be loaded in the memory 118 and processed by the processing unit 116.

The term "computer readable medium" in the present invention comprises computer storage medium. Computer storage medium comprises volatile or non-volatile, removable or non-removable medium which can be realized by any method or technology used to store information, such as computer readable instruction or other data. The memory 118 and the storage device 120 exemplify computer storage medium. Computer storage medium comprises but is not limited to RAM, ROM, EEPROM, flash memory or other memorizing skills, CD-ROM, DVD or other light storage devices, cassette tapes, tapes, disk storage devices or other magnetic storage devices, or any other medium which can be used to store expecting information and can be visited by the electronic device 112. Any computer storage medium alike can be a part of the electronic device 112.

The electronic device 112 also comprises a communication link 126 enabling the electronic device 112 communicate with other devices. The communication link 126 comprises but is not limited to a modem, a net interface card (NIC), an integrate net interface, a radio frequency (RF) transmitter/receiver, an infrared port, an USB interface or other interfaces linking the electronic device 112 to other electronic devices. The communication link 126 comprises cable connection or wireless connection. The communication link 126 transmits/receives communication media.

The term "computer readable medium" comprises communication medium. Typically, communication medium comprises computer readable instructions or other data in modulated data signals such as carrier wave or other transmission mechanism, and comprises any information delivery medium. The term "modulated data signals" comprises such signals with one or a plurality of properties to be set up or changed by the way of encoding information into signals.

The electronic device 112 comprises an inputting device 124, such as a keyboard, a mouse, a voice input device, a touch input device, an infrared camera, a video input device and/or any other input devices. The device 112 also comprises an output device 122, such as one or a plurality of display device, a loudspeaker, a printer and/or any other output devices. The input device 124 and the output device 122 can be connected to the electronic device 112 through cable connection, wireless connection or any other combination. In one embodiment, input devices or output devices from another electronic device can be used as the input device 124 or the output device 122 of the electronic device 112.

Components of the electronic device 112 can be connected through various interconnection such as buses. Such interconnection comprises peripheral components interconnection (PCI) (such as speedy PCI), universal serial buses (USB), IEEE 1394, optical bus structures, etc. In another embodiment, components of the electronic device 112 can be interconnected through network. For instance, the memory 118 can be formulated by a plurality of physical memory units interconnected through network whose physical locations are different.

A person skilled in the art will perceive that storage devices used to store computer readable instructions can dissipate over network. For instance, an electronic device 130 which can be visited through a network 128 can store computer readable instructions whose purpose is to realize one or a plurality of embodiments provided in the present invention. The electronic device 112 can visit the electronic device 130, download and perform part or all of the computer readable instructions. Alternatively, the electronic device 112 can download a plurality of computer readable instructions as needed; or, some instructions can be proceeded at the electronic device 112 and some instructions can be proceeded at the electronic device 130.

The article provides various operation of embodiments. In one embodiment, one or various operation mentioned can form one or a plurality of computer readable instructions stored on computer readable medium, which enable computing devices perform the mentioned operation when proceeded by electronic devices. The described sequence of some or all operations does not mean that these operations must stick to such sequence. A skilled person in the art will understand alternative sequences with the same benefits of the present invention. Moreover, it is understandable that not all operations must exist in every embodiment the article provides.

Furthermore, the term "preferable" in the article applies to examples, illustrations and instances. Any "preferable" aspect or design in the article is not necessary to be explained as more advantageous than other aspects and design. In contrast, the term "preferable" is used to raise a concept in practical way. For instance, the term "or" in the application means "besides" not "except". In other words, unless stated specifically or the context points otherwise, "X uses A or B" means any one of naturally included arrangement. That is to say, if X uses A, X uses B, or X uses A and B, then "X uses A or B" satisfies any embodiments mentioned above.

Furthermore, although the present invention has been exemplified and described by one or a plurality of embodiments, a skilled person in the art would be reminded of equivalent variants and modifications based on reading and understanding of this illustration and accompanying figures. The present invention comprises all such variants and modifications which are only limited by the range of accompanying claims. In particular, as to various functions which the components mentioned (such as elements and resources) perform, the terms describing such components is to correspond any components (unless instructed otherwise) able to perform the functions of the component concerned (i.e. equivalent in function). In addition, although a particular property of the present invention only disclose ones of several embodiments, such property can be combined with other properties of other embodiments which are expected or beneficial to one or a plurality of applications. Moreover, as to the terms "including", "comprising" and "consisting of" used in practical embodiments or claims, their meaning is identical with "containing".

In the process of data transmitting, every Transmission Control Protocol (TCP) packet comprises a sequence (SEQ) number and an acknowledging (ACK) number, both are network byte order. The SEQ number is a sequence number of the TCP packet indicating transmitting sequence of the TCP packet, while the ACK number is a confirmation number of the TCP packet indicating that the packet has been received. For instance, when a client establishes connection with a server through three handshake principle, the server sends a TCP packet carrying data to the client, while the SEQ number and the ACK number of the TCP packet are the same with the SEQ number and the ACK number of a packet in the third stage of establishing connection. When the client receives the TCP packet sent from the server, it sends a acknowledging packet back to the server, while the SEQ number of the acknowledging packet is the ACK number of last packet, and the ACK number of the acknowledging packet is the SEQ number of last packet plus the size of data the acknowledging packet is carrying.

It is the basic idea of the present invention: to solve the problem that conventional mobile terminals, especially mobile phones are vulnerable to DoS, setting up a defense module in mobile terminals in advance, and verifying connection request from external network or internal network through the defense module. Firstly, base d on the three handshake principle of TCP agreements, when external network or internal network sends a first SYN packet (i.e. a SYN packet), the defense module forges a handshake acknowledging packet (i.e. a SYN+ACK packet) to be sent to the external network or internal network. The attacking side is defined as the connection requesting side. If external network is the connection requesting side, when the defense module receives a follow-up acknowledge packet (i.e. an ACK packet) from the requesting side, the defense module creates a SYN packet, and decides whether to send the SYN packet to mobile terminals or LAN equipments linked below mobile terminals based on a TCP/IP protocol stack. When the defense module receives a SYN+ACK packet sent from the mobile terminals, the defense module abandons the SYN+ACK packet, and creates an ACK packet to be sent to mobile terminals or LAN equipments linked below mobile terminals. Mobile terminals or LAN equipments linked below mobile terminals verify the connection request through the ACK packet; if the connection request is verified, connection between the requesting side and mobile terminals or LAN equipments linked below mobile terminals is established. The defense module will increase immunity of mobile terminals to DoS and strengthen security of mobile terminals.

Figure 2:
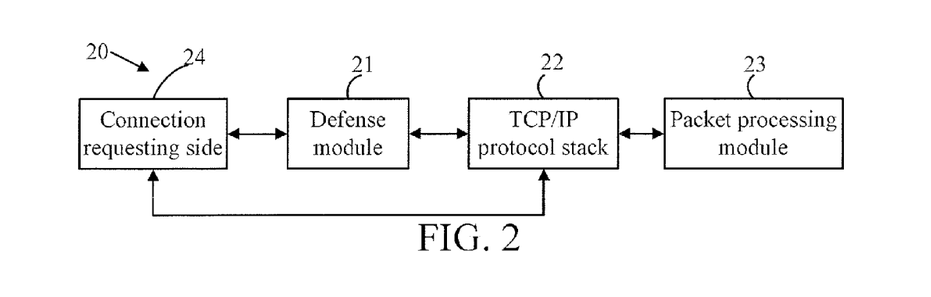
FIG. 2 shows a block diagram of an electronic device according to a preferred embodiment of the present invention.

Please refer to FIG. 2, a block diagram of an electronic device according to a preferred embodiment of the present invention. An electronic device 20 comprises one or more processors, a memory and one or more programs stored in the memory, a configured packet processing method performed by one or more processors, one or more programs partitioned by function, including a defense module 21, a TCP/IP protocol stack 22 and a packet processing module 23.

When the electronic device of the preferred embodiment 20 is working, when receiving a first SYN packet of connection request from a connection requesting side 24, the defense module 21 of the electronic device 20 creates a first SYN+ACK packet, and sends the first SYN+ACK packet to answer the connection requesting side 24;

when receiving the first SYN+ACK packet from the connection requesting side 24, the defense module 21 creates a second SYN+ACK packet with the same SEQ number and ACK number with the first SYN+ACK packet, and sends the second SYN+ACK packet to the packet processing module 23 of the electronic device 20 through the TCP/IP protocol stack 22, where the second SYN+ACK packet comprises the SEQ number Y of the first SYN+ACK packet;

the TCP/IP protocol stack 22 receives the second SYN+ACK packet from the packet processing module 23, and modifies the SEQ number Z of the second SYN+ACK packet to the SEQ number Y of the first SYN+ACK packet, and sends the modified second SYN+ACK packet to the defense module 21 while stores the difference value R of two SEQ numbers, where R=Z−Y;

when receiving the modified second SYN+ACK packet, the defense module 21 creates a second ACK packet with an ACK number Y+1, and sends the second ACK packet to the TCP/IP protocol stack 22;

Based on the difference value R of SEQ numbers, the TCP/IP protocol stack 22 modifies the ACK number of the second ACK packet to Z+1, and sends the modified second ACK packet to the packet processing module 23, so that handshake between the defense module 21 and the packet processing module 23 succeeds, and connection between the connection requesting side 24 and the packet processing module 23 is created. Based on a routing table, the TCP/IP decides whether the destination of the second ACK packet is the packet processing module 23 of the electronic device 20 or the network device linked with the electronic device 20 (with similar function of the packet processing module 23).

When the connection between the requesting side 24 and the packet processing module 23 establishes, the TCP/IP protocol stack 22 will process all packets exchanged between the requesting side 24 and the packet processing module 23. For instance: the TCP/IP protocol stack receives a packet from the connection requesting side 24, modifies an ACK number A of the packet to A+R, and sends the modified packet to the packet processing module 23; the TCP/IP protocol stack 22 receives the ACK packet from the packet processing module 23, modifies an ACK number B of the ACK packet to B−R, and sends the modified ACK packet to the connection requesting side 24. So that the connection requesting side 24 and the packet processing module 23 can exchange data normally through the TCP/IP protocol stack 22.

As the defense module 21 is set up between the connection requesting side 24 and the packet processing module 23, the defense module 21 decides whether to process new first SYN packets based on the number of the first SYN packets to be processed; where the first SYN packets to be processed are those which do not receive corresponding first ACK packets.

If the number of the first SYN packets is equal to or smaller than a first predetermined value (such as 100), the electronic device 20 is working normally, and the defense module 21 processes all new first SYN packets.

If the number of the first SYN packets is larger than the first predetermined value (such as 100) and equal to or smaller than a second predetermined value (such as 300), the electronic device 20 is in a moderate risky status, and the defense module 21 processes the first SYN packets to be processed. The new first SYN packets to be processed is those first SYN packets with no packet information records in the defense module 21. In other words, a hash chart is set up in the defense module 21; if packet information of a new first SYN packet (such as a source port, a source address, a destination port and a destination address of the first SYN packet) is not recorded in the hash chart, the defense module 21 processes the new first SYN packet (i.e. connection of a new IP is given priority).

If the number of the first SYN packets is larger than the second predetermined value (such as 300), the electronic device 20 is in a risky status, and the defense module 21 will not process any new first SYN packet except the first SYN packets in processing.

Preferably, if the number of the first SYN packets to be processed with a same IP address is larger than a fourth predetermined value (such as 5), the data connection from the IP address is decided to be aggressive data connection, and the defense module 21 abandons the corresponding data connection of the first SYN packets to be processed directly.

The electronic device of the preferred embodiment effectively solves the problem that conventional electronic devices, especially mobile phones are vulnerable to DoS attack; effectively prevent DoS attack, especially handshake signals (SYN) attack. When electronic devices, especially mobile phones are soft ap, attack on internal electronic devices from external network can be effectively prevented.

Figure 3:
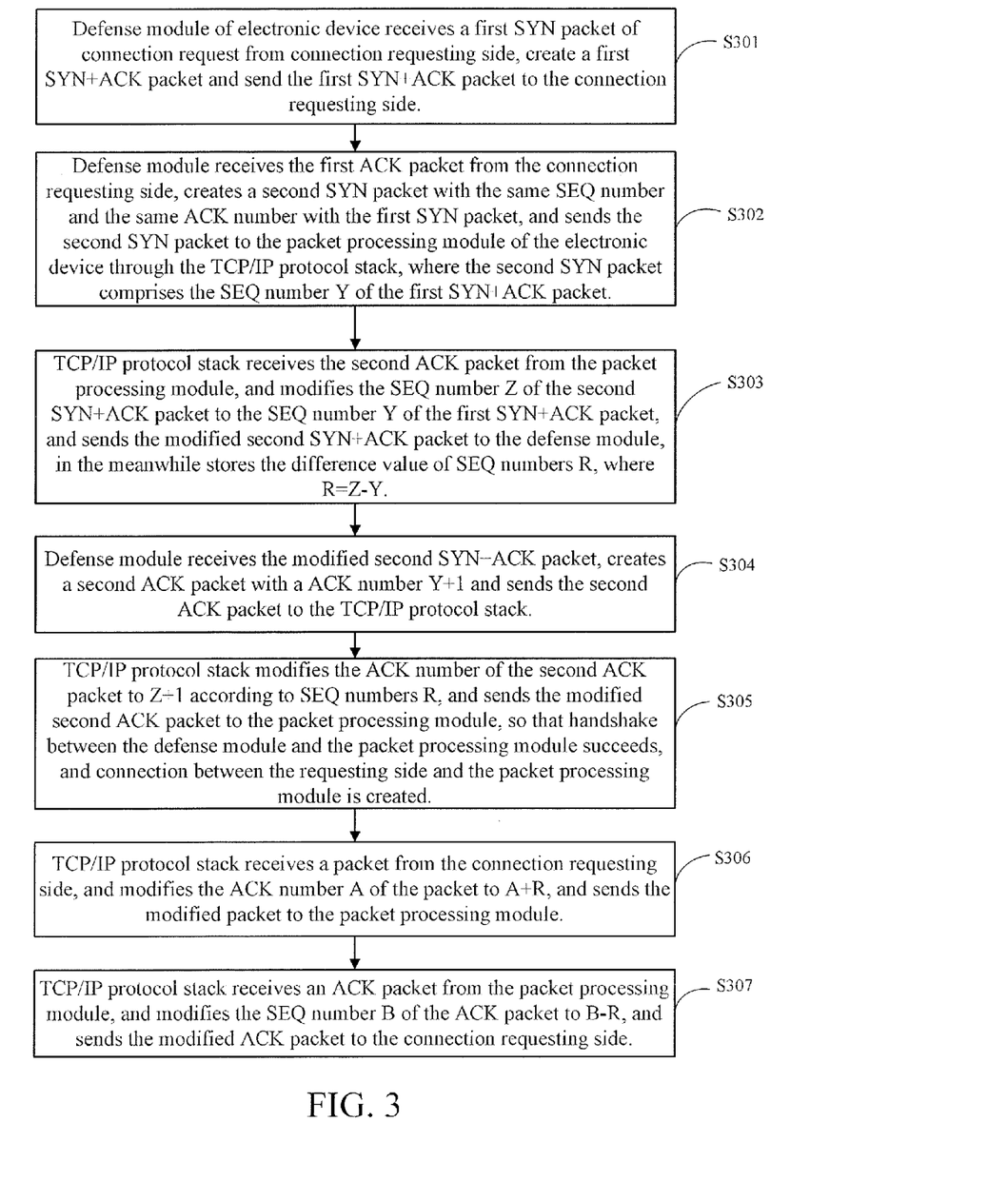
FIG. 3 shows a flowchart of a method for processing packets according to a preferred embodiment of the present invention.

Please refer to FIG. 3, a flow chart of the preferred embodiment of the packet processing method of the present invention. The packet processing method of the present invention comprises:

S301, when receiving the first SYN packet of connection request from the connection requesting side, the defense module of the electronic device creates a first SYN+ACK packet and sends the first SYN+ACK packet to the connection requesting side;

S302, when receiving the first ACK packet from the connection requesting side, the defense module creates a second SYN packet with the same SEQ number and the same ACK number with the first SYN packet, and sends the second SYN packet to the packet processing module of the electronic device through the TCP/IP protocol stack, where the second SYN packet comprises the SEQ number Y of the first SYN+ACK packet;

S303, the TCP/IP protocol stack receives the second ACK packet from the packet processing module, and modifies the SEQ number Z of the second SYN+ACK packet to the SEQ number Y of the first SYN+ACK packet, and sends the modified second SYN+ACK packet to the defense module, in the meanwhile stores the difference value of SEQ numbers R, where R=Z−Y;

S304, when receiving the modified second SYN+ACK packet, the defense module creates a second ACK packet with a ACK number Y+1 and sends the second ACK packet to the TCP/IP protocol stack;

S305, the TCP/IP protocol stack modifies the ACK number of the second ACK packet to Z+1 according to the difference value of SEQ numbers R, and sends the modified second ACK packet to the packet processing module, so that handshake between the defense module and the packet processing module succeeds, and connection between the requesting side and the packet processing module is created;

S306, the TCP/IP protocol stack receives a packet from the connection requesting side, and modifies the ACK number A of the packet to A+R, and sends the modified packet to the packet processing module;

S307, the TCP/IP protocol stack receives an ACK packet from the packet processing module, and modifies the SEQ number B of the ACK packet to B−R, and sends the modified ACK packet to the connection requesting side;

The packet processing method of the preferred embodiment ends at step S307.

As the defense module 21 is set up between the requesting side 24 and the packet processing module 23, the defense module 21 decides whether to process new first SYN packets according to the number of the first SYN packets to be processed; where the first SYN packets to be processed are those which do not receive the corresponding first ACK packets.

If the number of the first SYN packets is equal to or smaller than a first predetermined value (such as 100), the electronic device 20 is working normally, and the defense module 21 processes all new first SYN packets.

If the number of the first SYN packets is larger than the first predetermined value (such as 100) and equal to or smaller than a second predetermined value (such as 300), the electronic device 20 is in a moderate risky status, and the defense module 21 processes the first SYN packets to be processed. The new first SYN packets to be processed are those first SYN packets with no packet information records in the defense module 21. In other words, a hash chart is set up in the defense module 21; if packet information of a new first SYN packet (such as a source port, a source address, a destination port and a destination address of the first SYN packet) is not recorded in the hash chart, the defense module 21 processes the new first SYN packet (i.e. connection of a new IP is given priority).

If the number of the first SYN packets is larger than the second predetermined value (such as 300), the electronic device 20 is in a risky status, the defense module 21 will not process any new first SYN packet but those first SYN packets in processing.

Preferably, if the number of the first SYN packets to be processed with a same IP address is larger than a fourth predetermined value (such as 5), the data connection from the IP address is decided to be aggressive data connection, and the defense module 21 abandons directly the corresponding data connection of the first SYN packets to be processed.

The electronic device of the preferred embodiment effectively solves the problem that conventional electronic devices, especially mobile phones are vulnerable to DoS attack; effectively prevent DoS attack, especially handshake signals (SYN) attack. When electronic devices, especially mobile phones are soft ap, attack on internal electronic devices from external network can be effectively prevented.

Figure 4:
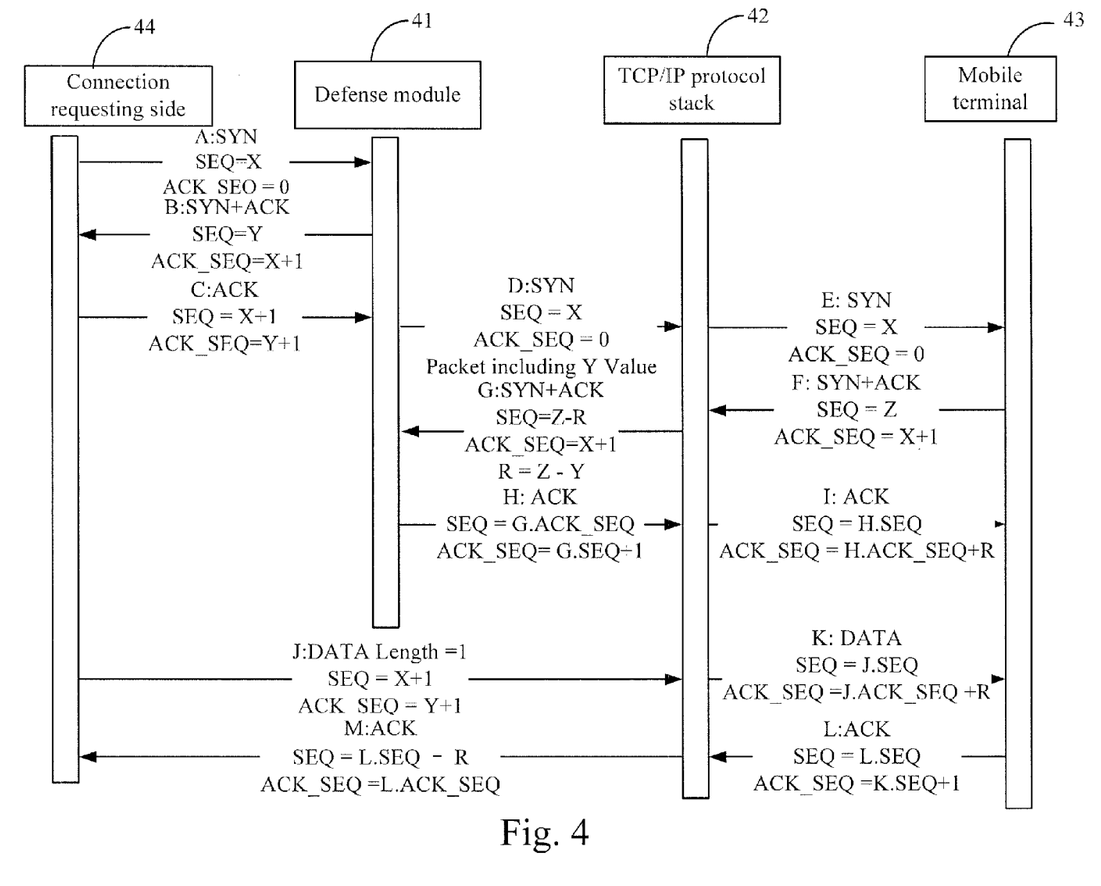
FIG. 4 illustrates the operation of the electronic device and the method for processing packets according to a preferred embodiment of the present invention.

Please refer to FIG. 4, a diagram of the principle of the detailed embodiment of the packet processing method and the electronic device of the present invention. The packet processing method provides DoS defense function comprising the following steps:

pre-installing a defense module 41 to defense DoS in a mobile terminal 43;

when a connection requesting side 44 sends a first SYN packet of connection request to the defense module 41, the defense module 41 forges a first SYN+ACK packet, and sends the first SYN+ACK to the connection requesting side 44;

when the defense module 41 receives a first ACK packet from the connection requesting side 44, the defense module 41 creates a second SYN packet with the same SEQ number and the same ACK number with the first SYN packet, and sends the second SYN packet to the mobile terminal 43 through the TCP/IP protocol stack as the connection requesting side 44;

the TCP/IP protocol stack 42 receives the second SYN+ACK packet from the mobile terminal 43, and obtains a first SEQ difference value by subtracting the SEQ number of the first SYN+ACK packet from the SEQ number of the second SYN+ACK packet;

the TCP/IP protocol stack 42 modifies the SEQ number of the second SYN+ACK packet sent from the mobile terminal 43 to the defense module 41, and subtracts the difference value of the SEQ numbers from SEQ number of the second SYN+ACK packet; and modifies the ACK number of the second ACK packet from the defense module 41 to the mobile terminal 43, and modifies the ACK number of the second SYN+ACK packet by adding the difference value of SEQ numbers to the ACK number of the second SYN+ACK packet;

the modified ACK number of the second ACK packet equals with the SEQ number of the second SYN+ACK packet plus one, so that handshake between the defense module 41 and the mobile terminal 43 succeeds, and connection between the connection requesting side 44 and the mobile terminal 43 establishes.

The following part is detailed description of the steps mentioned above with concrete embodiments.

In the embodiment, the mobile 43 is a mobile phone or other mobile internet terminal. The defense module 41 is realized through software, and performs as an application of the mobile terminal 43.

Firstly, the defense module 41 is initialized and creates a hash chart to store SYN packet information of TCP. Secondly, the mobile terminal 43 performs type-of-protocol testing and provides different processing to different types of protocol accordingly. When receiving a type of TCP protocol packet, the mobile terminal 43 performs the above steps.

As FIG. 4 indicates, the connection requesting side 44 establishes connection with the defense module 41 based on three-handshake principle of TCP, and the defense module 41 sends a SYN packet to the mobile terminal 43 as the connection requesting side 44, the SEQ number of which is the same with that of the SYN packet sent by the connection requesting side 41 to the defense module 41. We define the SYN packet sent from the connection requesting side 44 to the defense module 41 as a first SYN packet, and the SYN packet sent from the connection requesting side 44 to the mobile terminal 43 as a second SYN packet which is processed by the TCP/IP protocol stack 42 of the mobile terminal 43. To facilitate processing of the second SYN packet by the TCP/IP protocol stack 42, the defense module 41 sets up in the second SYN packet a label signifying data contained. The label signifies that the SYN packet has been processed by the defense module 41 and contains data. The first 4 bytes of the label signifies that the SYN packet has been processed (for example, content of the first 4 bytes can be 0x123456), and the second 4 bytes signifies content of the packet, which is the SEQ number of the SYN+ACK packet the defense module 41 sends to the connection requesting side 44, i.e. the SEQ number of the first SYN+ACK packet defined as Y. When receiving the second SYN packet, the TCP/IP protocol stack extracts the SEQ number and the ACK number of the second SYN packet based on the label the defense module 41 sets up, where the SEQ number of the second SYN packet is obtained by subtracting one from the SEQ number of the first SYN+ACK packet. So that the SEQ numbers of the second and the first SYN packets are the same, which makes it easier for the defense module 41 to connect with the mobile terminal 43 as the connection requesting side 44. The TCP/IP protocol stack extracts the SEQ number Y of the first SYN+ACK packet, which is identical with the data in the second SYN packet based on the label.

The TCP/IP protocol 42 sends the second SYN packet to the mobile terminal 43 which feeds back a SYN+ACK packet defined as a second SYN+ACK packet. The second SYN+ACK packet with a SEQ number defined as Z is processed by the TCP/IP protocol stack 42. The TCP/IP protocol stack 42 extracts the SEQ number Z of the second SYN+ACK packet and subtracts the SEQ number Y of the first SYN+ACK packet from the SEQ number Z of the second SYN+ACK packet to obtain a difference value R (R=Z−Y) of SEQ numbers. The TCP/IP protocol stack 42 modifies the SEQ number of the second SYN+ACK packet, i.e. subtracting the SEQ number of the second SYN+ACK packet from the difference value R of SEQ numbers, and sends the modified SYN+ACK packet to the defense module 41. The defense module 41 abandons the modified SYN+ACK packet and creates an ACK packet defined as a second ACK packet. The ACK number of the second ACK packet is the SEQ number of the modified SYN+ACK packet plus one. The defense module 41 sends the ACK packet to the TCP/IP protocol stack 42 to process. The TCP/IP protocol stack 42 modifies the second ACK packet, i.e. adding the difference value R of SEQ numbers to the ACK number of the ACK packet, and the SEQ number of the modified second ACK packet is (Z−R+1)+R=Z+1. The SEQ number of the modified second ACK packet received by the mobile terminal 43 is equal to the SEQ number of the second SYN+ACK packet plus 1. Therefore the defense module 41 successfully three-handshake with the mobile terminal 43 as the connection requesting side 44, and a reliable connection between the external network of the connection requesting side 44 and the mobile terminal 43 is created through the defense module 41.

After connection between the connection requesting side 44 and the mobile terminal 43 establishes, the TCP/IP protocol stack 42 modifies the ACK number of the TCP packet the connection requesting side 44 sends and the SEQ number of the ACK packet the mobile terminal 43 answers, and adds the difference value of the SEQ numbers to the ACK number of the TCP packet the connection requesting side 44 sends, meanwhile subtracts the difference value of the SEQ numbers from the SEQ number of the ACK packet the mobile terminal 43 answers to prevent DoS.

In the process above mentioned, the mobile terminal 43 counts the number of the SYN packets received and decides whether the mobile terminal 43 is attacked by DoS from TCP by testing numbers of SYN packets and packets with only SYN but no ACK within a time period. For instance, counting the number of current SYN packets in every 3 seconds including those which sends only SYN packets but not ACK packets. When the number of current SYN packets is smaller than 100, the mobile terminal 43 is working normally; when the number of current SYN packets is larger than 100 and smaller than 300, the mobile terminal 43 is in a moderate risk status; when the number of current SYN packets is larger than 300, the mobile terminal 43 is in a risky status. No matter in what status, if a given IP address sends five SYN packets while not sending any ACK packets, this address is regarded as an attacking address, and the packet will be abandoned directly to prevent DoS attack.

Normally the mobile terminal 43 processes all SYN packets. However, in a risky status, as the mobile terminal 43 is busy with processing data, it is very likely that the packet will be abandoned directly. At such times only received packets are processed and the number of the SYN packets every address sends is smaller than 5, otherwise the packet will be abandoned. When the mobile terminal 43 is in a moderate risky status, in other words the number of SYN packets the connection requesting side 44 sends is in a predetermined range of [100,300] as mentioned above, only the SYN packets leaving no records in the hash chart will be processed. The processing includes extracting a source port, a source address, a destination port and a destination address contained in the SYN data; hashing those four values and storing them in the hash chart. If the mobile terminal 43 is in a risky status, the packet is abandoned directly.

In the process above mentioned, the TCP/IP protocol stack looks up a routing table to decide whether the destination of the second SYN packet is the mobile terminal 43 or the network equipment of the mobile terminal 43. When the mobile terminal 43 is a network hotspot, the LAN device linked below the mobile terminal 43 establishes reliable connection with external network using the mobile terminal 43 as a data transfer point.

The embodiment above mainly illustrates the scenario when the type of packet the connection requesting side 44 sends is TCP protocol. When the type of packet the connection requesting side 44 sends to the mobile terminal 43 is ICMP or UDP protocol, the mobile terminal 43 will count the number of ICMP or UDP packets received to decide whether network attack exists The limited number of ICMP packets is set up as a fifth predetermined value and the limited number of UDP packets is set up as a sixth predetermined value. When the number of ICMP packets surpasses the fifth predetermined value or the number of UDP packets surpasses the sixth predetermined value, the number of ICMP or UDP packets to be received is controlled. For instance, the fifth predetermined value is 100, and the sixth predetermined value is 200; if it is predetermined that only 100 ICMP packets and 200 UDP packets can be received in every second, when the predetermined values are surpassed, the surplus ICMP or UDP packets will be abandoned directly.

The mobile terminal 43 in the present invention is communication terminals such as mobile phones or tablet computers.

The packet processing method of the present invention presets a defense module preventing DoS in the mobile terminal. The connection requesting side establishes connection with the defense module according to three-handshake principle of TCP, and the defense module sends a SYN packet to the mobile terminal as the connection requesting side. When the defense module successfully handshakes with the mobile terminal, connection between the connection requesting side and the mobile terminal is created, so that DoS attack, especially SYN attack can be effectively prevented. When mobile terminals, especially mobile phones are network hotspot, attack on internal mobile terminal from external network can be effectively prevented.

The present invention has been described with reference to certain preferred and alternative embodiments which are intended to be exemplary only and not limited to the full scope of the present invention as set forth in the appended claims.

What is claimed is:

1. A method for packet processing, comprising:

when receiving a first handshake (SYN) packet of connection request from a connection requesting side, establishing a first handshake-acknowledge (SYN-ACK) packet using a defense module of a hardware memory of an electronic device, and responding the connection requesting side by sending the first handshake-acknowledge packet to the connection requesting side;

when receiving a first acknowledging (ACK) packet from the connection requesting side, creating a second handshake packet with the same SEQ number and the same ACK number with the first handshake packet, and sending the second handshake packet to a packet processing module of the hardware memory of the electronic device through a transmission control protocol/internet protocol (TCP/IP) protocol stack, wherein the second handshake packet comprises a SEQ number Y of the first handshake-acknowledge packet;

the TCP/IP protocol stack receiving a second handshake-acknowledge packet from the packet processing module, and modifying a SEQ number Z of the second handshake-acknowledge packet to the SEQ number Y of the first handshake-acknowledge packet, and sending the modified second handshake-acknowledge packet to the defense module, at the same time storing a difference value R of SEQ numbers, wherein R=Z−Y;

when receiving the modified second handshake-acknowledge packet, establishing a second acknowledge packet with an ACK number Y+1 by using the defense module, and sending the second acknowledge packet to the TCP/IP protocol stack; and the TCP/IP protocol stack modifying the ACK number of the second acknowledge packet to Z+1 according to the difference value R of SEQ numbers, and sending the modified second acknowledge packet to the packet processing module, so that handshake between the defense module and the packet processing module succeeds, and connection between the connection requesting side and the packet processing module is created;

wherein if the number of first handshake packets to be processed is equal to or smaller than a first predetermined value, the defense module processes new first handshake packets;

if the number of the first handshake packets to be processed is larger than the first predetermined value and equal to or smaller than a second predetermined value, the defense module processes unrecorded first handshake packets, wherein the unrecorded first handshake packets is the first handshake packets with no packet information recorded in the defense module; and if the number of the first handshake packets to be processed is larger than the second predetermined value, the defense module does not process the new first handshake packets.

2. The method of claim 1, further comprising:

when connection between the connection requesting side and the packet processing module is established, receiving a packet from the connection requesting side by using the TCP/IP protocol stack, and modifying an ACK number A of the packet to A+R, and sending the modified packet to the packet processing module; and receiving an acknowledge packet from the packet processing module by using the TCP/IP protocol stack, and modifying a SEQ number B of the acknowledge packet to B−R, and sending the modified acknowledge packet to the connection requesting side.

3. The method of claim 1, comprising:

according to the number of the first handshake packets to be processed by the defense module, ascertaining whether to process the new first handshake packets, wherein the first handshake packets to be processed are the first handshake packets that do not receive corresponding first acknowledge packets.

4. The method of claim 1, wherein a hash chart is set up in the defense module, if the packet information of the new first handshake packets is not recorded in the hash chart, the defense module processes the new first handshake packets.

5. The method of claim 4, wherein the packet information comprises a source port, a source address, a destination port and a destination address of the first handshake packet.

6. The method of claim 3, wherein the number of the first handshake packets to be processed with a given IP address is larger than a predetermined value, the defense module abandons the corresponding data connection of the first handshake packets to be processed.

7. The method of claim 1, wherein the TCP/IP protocol stack decides whether the destination of the second acknowledge packet is the packet processing module of the electronic device or a network device connected with the electronic device according to a routing table.

8. An electronic device comprising:

one or more processors;

a memory;

one or more programs stored in the memory, being executed by the one or more processors to perform a method of processing packets, the one or more programs comprises a defense module, a TCP/IP protocol stack, and a packet processing module;

when receiving a first handshake (SYN) packet of connection request from a connection requesting side, the defense module establishes a first handshake-acknowledge (SYN-ACK) packet, and responds the connection requesting side by sending the first handshake-acknowledge packet to the connection requesting side;

when receiving a first acknowledging (ACK) packet from the connection requesting side, the defense module creates a second handshake packet with the same SEQ number and the same ACK number with the first handshake packet, and sends the second handshake packet to the packet processing module through a transmission control protocol/internet protocol (TCP/IP) protocol stack, where the second handshake packet comprises a SEQ number Y of the first handshake-acknowledge packet;

the TCP/IP protocol stack receives a second handshake-acknowledge packet from the packet processing module, and modifies a SEQ number Z of the second handshake-acknowledge packet to the SEQ number Y of the first handshake-acknowledge packet, and sends the modified second handshake-acknowledge packet to the defense module, at the same time storing a difference value R of SEQ numbers, where R=Z−Y;

when receiving the modified second handshake-acknowledge packet, the defense module establishes a second acknowledge packet with an ACK number Y+1, and sends the second acknowledge packet to the TCP/IP protocol stack; and the TCP/IP protocol stack modifies the ACK number of the second acknowledge packet to Z+1 according to the difference value R of SEQ numbers, and sends the modified second acknowledge packet to the packet processing module, so that handshake between the defense module and the packet processing module succeeds, and connection between the connection requesting side and the packet processing module is created;

wherein if the number of first handshake packets to be processed is equal to or smaller than a first predetermined value, the defense module processes new first handshake packets;

if the number of the first handshake packets to be processed is larger than the first predetermined value and equal to or smaller than a second predetermined value, the defense module processes unrecorded first handshake packets, wherein the unrecorded first handshake packets is the first handshake packets with no packet information recorded in the defense module; and if the number of the first handshake packets to be processed is larger than the second predetermined value, the defense module does not process the new first handshake packets.

9. The electronic device of claim 8, wherein when connection between the connection requesting side and the packet processing module is established, the TCP/IP protocol stack receives a packet from the connection requesting side, and modifies an ACK number A of the packet to A+R, and sends the modified packet to the packet processing module; and the TCP/IP protocol stack receives an acknowledge packet from the packet processing module, and modifies a SEQ number B of the acknowledge packet to B−R, and sends the modified acknowledge packet to the connection requesting side.

10. The electronic device of claim 8, wherein the defense module determines whether to process the new first handshake packets according to the number of the first handshake packets to be processed, where the first handshake packets to be processed are the first handshake packets that do not receive corresponding first acknowledge packets.

11. The electronic device of claim 8, wherein a hash chart is set up in the defense module, if the packet information of the new first handshake packets is not recorded in the hash chart, the defense module processes the new first handshake packets.

12. The electronic device of claim 11, wherein the packet information comprises a source port, a source address, a destination port and a destination address of the first handshake packet.

13. The electronic device of claim 10, wherein the number of the first handshake packets to be processed with a given IP address is larger than a fourth predetermined value, the defense module abandons the corresponding data connection of the first handshake packets to be processed.

14. The electronic device of claim 8, wherein the TCP/IP protocol stack decides whether the destination of the second acknowledge packet is the packet processing module of the electronic device or a network device connected with the electronic device according to a routing table.

15. A non-transitory computer readable storage medium storing instructions executed by a processor for performing a method of packet processing, the method comprising:

when receiving a first handshake (SYN) packet of connection request from a connection requesting side, establishing a first handshake-acknowledge (SYN-ACK) packet using a defense module of a hardware memory of an electronic device, and responding the connection requesting side by sending the first handshake-acknowledge packet to the connection requesting side;

when receiving a first acknowledging (ACK) packet from the connection requesting side, creating a second handshake packet with the same SEQ number and the same ACK number with the first handshake packet, and sending the second handshake packet to a packet processing module of the hardware memory of the electronic device through a transmission control protocol/internet protocol (TCP/IP) protocol stack, wherein the second handshake packet comprises a SEQ number Y of the first handshake-acknowledge packet;

receiving a second handshake-acknowledge packet from the packet processing module through the TCP/IP protocol stack, and modifying a SEQ number Z of the second handshake-acknowledge packet to the SEQ number Y of the first handshake-acknowledge packet, and sending the modified second handshake-acknowledge packet to the defense module, at the same time storing a difference value R of SEQ numbers, wherein R=Z−Y;

when receiving the modified second handshake-acknowledge packet, establishing a second acknowledge packet with an ACK number Y+1 by using the defense module, and sending the second acknowledge packet to the TCP/IP protocol stack; and according to the difference value R of SEQ numbers, modifying the ACK number of the second acknowledge packet to Z+1 through the TCP/IP protocol stack, and sending the modified second acknowledge packet to the packet processing module, so that handshake between the defense module and the packet processing module succeeds, and connection between the connection requesting side and the packet processing module is created;

wherein if the number of first handshake packets to be processed is equal to or smaller than a first predetermined value, the defense module processes new first handshake packets;

if the number of the first handshake packets to be processed is larger than the first predetermined value and equal to or smaller than a second predetermined value, the defense module processes unrecorded first handshake packets, wherein the unrecorded first handshake packets is the first handshake packets with no packet information recorded in the defense module; and if the number of the first handshake packets to be processed is larger than the second predetermined value, the defense module does not process the new first handshake packets.

* * * * *